(12) United States Patent
Lemke et al.

(10) Patent No.: US 10,036,471 B2
(45) Date of Patent: Jul. 31, 2018

(54) PORTED ENGINE CONSTRUCTIONS WITH LOW-TENSION COMPRESSION SEALS

(75) Inventors: James U. Lemke, La Jolla, CA (US); Bryant A. Wagner, San Diego, CA (US)

(73) Assignee: ACHATES POWER, INC., San Diego, CA (US)

(*) Notice: Subject to any disclaimer, the term of this patent is extended or adjusted under 35 U.S.C. 154(b) by 2281 days.

(21) Appl. No.: 12/592,030

(22) Filed: Nov. 18, 2009

(65) Prior Publication Data

US 2011/0114038 A1    May 19, 2011

(51) Int. Cl.
*F02F 3/00* (2006.01)
*F16J 9/14* (2006.01)
*F02F 1/18* (2006.01)

(52) U.S. Cl.
CPC .............. *F16J 9/14* (2013.01); *F02F 1/186* (2013.01)

(58) Field of Classification Search
CPC ........ F02B 75/28; F02B 2275/40; F02F 1/186
USPC ...................................................... 123/193.6
See application file for complete search history.

(56) References Cited

U.S. PATENT DOCUMENTS

| | | | |
|---|---|---|---|
| 3,727,927 A | 4/1973 | Packard | 277/216 |
| 3,759,148 A | 9/1973 | Geffroy | 92/160 |
| 3,887,198 A | 3/1975 | McClure et al. | 277/27 |
| 3,895,815 A | 7/1975 | Panigati | 277/171 |
| 4,165,079 A | 8/1979 | Clements | 277/9.5 |
| 4,299,401 A | 11/1981 | McCormick | 277/216 |
| 4,350,352 A | 9/1982 | Kolarik | 277/216 |
| 4,421,328 A | 12/1983 | Thurston et al. | 277/216 |
| 4,497,494 A | 2/1985 | Allen et al. | 277/27 |
| 4,633,907 A | 1/1987 | Adams | 137/625 |
| 4,681,326 A | 7/1987 | Kubo | 277/27 |
| 4,848,212 A * | 7/1989 | Kawano | F16J 9/00 123/193.6 |
| 5,042,441 A * | 8/1991 | Paul | F01B 7/14 123/257 |
| 5,065,707 A * | 11/1991 | Elsbett | F01M 1/08 123/41.42 |
| 5,083,536 A * | 1/1992 | Ariga | F16J 9/08 123/193.6 |
| 5,136,781 A | 8/1992 | Stoll | 29/888.3 |
| 5,251,915 A * | 10/1993 | Meernik | 277/457 |

(Continued)

FOREIGN PATENT DOCUMENTS

EP    1564396 A2    8/2005

OTHER PUBLICATIONS

"Vehicle and Engine Technology", Second Edition, Heinz Heisler, SAE International, pp. 397-403.

(Continued)

*Primary Examiner* — Marguerite McMahon
*Assistant Examiner* — James Kim
(74) *Attorney, Agent, or Firm* — Terrance A. Meador (57) ABSTRACT

In ported engine constructions, cooling of piston crowns and cylinder liners results in reduction or elimination of bore/liner distortions, thus ensuring circularity of the bore/piston interface throughout engine operation. Consequently, the need for heavily-tensioned piston rings is eliminated. Such engine constructions incorporate annular low-tension compression seals on the pistons, which substantially reduce port bridge wear during all phases of engine operation while also limiting blow-by during combustion.

4 Claims, 7 Drawing Sheets

(56) References Cited

U.S. PATENT DOCUMENTS

| | | | |
|---|---|---|---|
| 5,392,692 A | 2/1995 | Rao et al. | 92/246 |
| 5,632,494 A | 5/1997 | Oka | 277/59 |
| 5,713,324 A * | 2/1998 | Frame et al. | 123/193.6 |
| 6,148,785 A * | 11/2000 | Rivers et al. | 123/193.1 |
| 6,196,063 B1 | 3/2001 | Kasai et al. | 73/120 |
| 6,283,478 B1 | 9/2001 | Kumai et al. | 277/435 |
| 6,418,885 B1 * | 7/2002 | Paul et al. | 123/25 C |
| 6,705,616 B2 * | 3/2004 | Fujii | F16J 9/06 277/434 |
| 7,549,401 B2 * | 6/2009 | Lemke et al. | 123/41.34 |
| 7,669,560 B2 * | 3/2010 | Elsbett | F01L 5/06 123/188.5 |
| 2003/0184023 A1 | 10/2003 | Masuyama et al. | 277/434 |
| 2004/0134457 A1 * | 7/2004 | Evans | F16J 9/06 123/193.4 |
| 2006/0006604 A1 * | 1/2006 | Abe et al. | 277/434 |
| 2006/0096557 A1 * | 5/2006 | Christain | F02F 3/22 123/41.38 |
| 2006/0169135 A1 * | 8/2006 | Usui et al. | 92/248 |
| 2007/0272078 A1 * | 11/2007 | Yamada et al. | 92/208 |
| 2008/0115771 A1 * | 5/2008 | Elsbett | F01L 5/06 123/51 BA |
| 2008/0256794 A1 * | 10/2008 | Maier | 29/888.07 |
| 2010/0186723 A1 | 7/2010 | Lemke et al. | 123/51 B |

OTHER PUBLICATIONS

"Engine Pistons Types, Operation, Damage"., Stefan Zima, 1$^{st}$ Edition, Sep. 2005, Chapter 17, section 17.3.6.

"Opposed Piston Engines: Evolution, Use, and Future Applications", Jean-Pierre Pirault, Martin Flint, SAE International, pp. 490-493.

"Pressure Ring Device for Engine Piston", Abstract of JP5106736.

"Full Keystone Type Piston Ring", Abstract of JP2001182831.

* cited by examiner

PORTED ENGINE CONSTRUCTIONS WITH LOW-TENSION COMPRESSION SEALS

RELATED APPLICATIONS

The following patents and patent applications, all commonly assigned to the assignee of this application, contain subject matter related to the subject matter of this application:

U.S. Pat. No. 7,156,056, issued Jan. 2, 2007 for "Two Cycle, Opposed Piston Internal Combustion Engine";

WO/2005/124124, published on Dec. 29, 2005 for "Improved Two Cycle, Opposed Piston Internal Combustion Engine";

U.S. Pat. No. 7,270,108, issued Sep. 18, 2007 for "Opposed Piston, Homogeneous Charge Pilot Ignition Engine";

WO/2006/105390 published on Oct. 5, 2006 for "Opposed Piston, Homogeneous Charge, Pilot Ignition Engine";

U.S. Pat. No. 7,334,570, issued Feb. 26, 2008 for "Common Rail Fuel Injection System With Accumulator Injectors";

WO/2006/107892 published on Oct. 12, 2006 for "Common Rail Fuel Injection System With Accumulator Injectors";

U.S. Pat. No. 7,360,511, issued Apr. 22, 2008 for "Opposed Piston Engine";

WO 2007/109122 published on Sep. 27, 2007 for "Opposed Piston Engine";

U.S. Pat. No. 7,546,819 issued Jun. 16, 2009 for "Two Stroke, Opposed-Piston Internal Combustion Engine";

U.S. Pat. No. 7,549,401 issued Jun. 23, 3009 for "Two-Cycle, Opposed-Piston Internal Combustion Engine";

U.S. patent application Ser. No. 11/642,140, filed Dec. 20, 2006, for "Two Cycle, Opposed Piston Internal Combustion Engine";

U.S. patent application Ser. No. 11/725,014, filed Mar. 16, 2007, for "Opposed Piston Internal Combustion Engine With Hypocycloidal Drive and Generator Apparatus", published as US/2007/0215093 on Sep. 20, 2007;

U.S. Pat. No. 7,591,235 issued Sep. 22, 2009 for "Opposed Piston Engine With Piston Compliance";

U.S. patent application Ser. No. 12/075,557, filed Mar. 12, 2008, for "Internal Combustion Engine With Provision for Lubricating Pistons";

U.S. patent application Ser. No. 12/456,735, filed Jun. 22, 2009, for "Two-Cycle Opposed-Piston, Internal Combustion Engine"; and, U.S. patent application Ser. No. 12/586,352, filed Sep. 21, 2009, for "Opposed-Piston Engine".

BACKGROUND

The technical field relates to a ported internal combustion engine. More specifically the technical field relates to a ported internal combustion engine that incorporates low-tension compression seals to achieve high BMEP (brake mean effective pressure) operation. The technical field also relates to an opposed-piston, compression ignition engine in which low-tension compression seals are mounted to the opposed pistons so as to minimize port bridge wear during all phases of engine operation while also limiting blow-by during combustion.

A ported internal combustion engine is an internal combustion engine having a cylinder with one or more ports formed therein for the passage of air into and/or out of the bore. For example, the cylinder of a traditional opposed-piston engine includes exhaust and inlet ports cast or machined into the cylinder near respective exhaust and inlet ends of the cylinder liner. Pistons disposed crown-to-crown in the liner's bore traverse the ports while moving through respective bottom dead center (BDC) positions. Rings are mounted to the pistons to maintain a seal between the pistons and the liner bore, which reduces the passage of combustion gasses between the pistons and the bore (blow-by). The rings are heavily tensioned against the bore to accommodate bore/liner distortion caused by thermal and mechanical stresses. Each piston and its rings traverse a respective port twice during every complete engine cycle. The heavy tension forces the outer surfaces of the rings into a high frictional engagement with the bore and with the port bridges, especially where the rings contact the edges of the port openings. As a consequence, repeated transits by the rings over the ports result in excessive and uneven port bridge wear, and, ultimately, early ring failures. The exhaust piston rings suffer particularly heavy damage due to the high temperatures encountered at the exhaust port.

As a result of low durability due to bridge wear, traditional ported engines have had very limited acceptance in the markets for land, air, and marine engines. Measures have been proposed to reduce the complex frictional interface between the piston rings and the port bridges. One such step includes excessive lubrication of the piston/bore interface. However, oil consumption in these cases is typically about 2% of fuel consumption, as compared to portless engines in which oil consumption is typically about 0.1% of fuel consumption. Such high oil consumption is not acceptable under modern emission standards. Other measures include rounding and/or ramping the outer edges of the rings, beveling the edges of the port openings, and customizing the shapes of the port openings. However, these solutions add to manufacturing costs and will continue to have only limited effectiveness so long as the rings are heavily tensioned.

Ported engine constructions have been proposed which incorporate pistons with axially symmetrical construction and coolant structures for cooling pistons and cylinder liners that reduce or eliminate bore/liner distortions throughout engine operation. Because these cooling designs maintain circularity of the bore/piston interface longitudinally of the cylinder throughout engine operation, they eliminate the need for heavily-tensioned rings. An example of such a design in an opposed piston engine construction is found in commonly-owned U.S. Pat. No. 7,360,511, issued Apr. 22, 2008. Accordingly, we have realized that ported internal combustion engines in which circularity of the bore/piston interface is maintained during all phases of engine operation are well-suited for low-tension piston compression seals which substantially reduce wear on port bridges while also limiting blow-by.

SUMMARY

Low-tension compression seals provide an effective seal between the cylinder bore and piston thereby maintaining compression and preventing blow-by, while reducing or eliminating the problem of frictional interaction with the port bridges.

These objects are achieved by a compression seal device in a ported internal combustion engine in which circularity is maintained between the bore of a ported cylinder and an axially symmetrical piston having a compression seal mounted in an annular groove. The compression seal has an annular bearing surface to maintain a sealing annular contact with the bore, with no clearance between the bearing surface and the bore, in response to a residual low level of compression seal tension in the direction of the bore when the piston is near a bottom dead center (BDC) position. The bearing surface maintains a sealing annular contact with the bore, with no clearance between the bearing surface and the bore, in response to a high level of compression seal tension in the direction of the bore resulting from pressure of combustion acting against an inner peripheral surface of the compression seal when the piston is near a top dead center (TDC) position.

In a ported engine, a low-tension, essentially circular compression seal is compressed slightly when mounted to a piston so as to permit the piston to be received in the bore of a ported cylinder where the compression seal is very lightly loaded against the bore at an initial low level of tension such that there is no clearance between the bearing surface of the compression seal and the bore. During combustion, when the piston has moved through a top dead center (TDC) position the high-pressure compression gasses act upon the inner peripheral surface of the compression seal, which presses the bearing surface of the seal more tightly against the cylinder bore at a higher level of tension, thereby firmly sealing the space between the bore and the piston and preventing blow-by. As the piston approaches a port and the compression pressure approaches ambient pressure, the compression seal relaxes to its low tension mode, thereby substantially reducing friction between itself and the port bridges as the port is traversed.

A manufacturing process yields annular compression seals which exhibit very low tension when mounted to a piston in a ported cylinder.

DETAILED DESCRIPTION OF THE PREFERRED EMBODIMENTS

A low tension compression seal for use on a piston in a ported internal combustion engine is illustrated in one or more of the above-described drawings, and is disclosed in detail in the following description. Preferably, a "low tension compression seal" is an annular device which, when mounted to a piston received in the bore of a ported engine, is loaded against the bore by a tension of 3 Newtons, or less, such that there is no clearance between the bearing surface of the compression seal and the bore when the engine is not operating; more desirably still, the low tension compression seal is loaded against the bore by a tension of nominally 0 Newtons such that there is no clearance between the bearing surface of the compression seal and the bore when the engine is not operating.

Figure 1A:
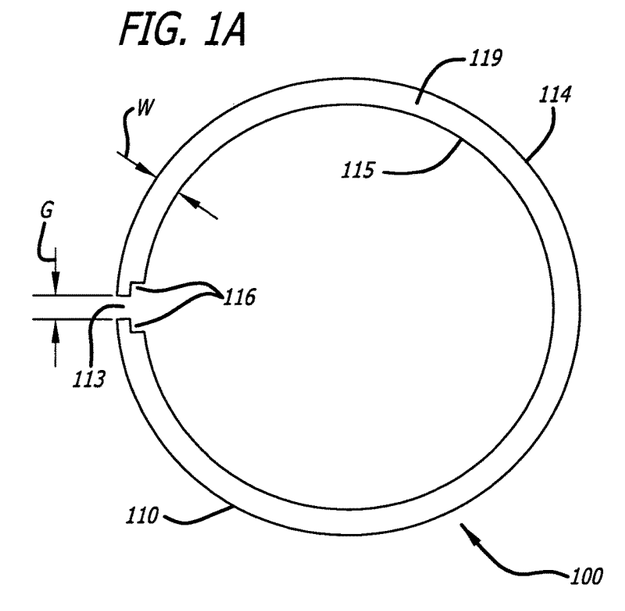
FIG. 1A is a plan view of a low-tension compression seal in an uncompressed condition.

A low-tension compression seal (hereinafter, "compression seal") is shown in FIG. 1A, where the view is toward a side surface of the compression seal and FIG. 1C, where the view is toward an annular outer peripheral surface (hereinafter, a "bearing surface") of the compression seal. In these figures, the compression seal 100, which has a body 110 with a generally circular or annular shape, is shown in a "free" state where it is has not been compressed diametrically and is not subject to combustion pressures. A gap 113 opens between a bearing surface 114 and an annular inner peripheral surface 115. An alignment notch 116 is cut into the inner peripheral surface 115. Preferably, the alignment notch 116 is positioned at the inside end of the gap 113 in order to align the gap with a bridge of an inlet or exhaust port of a ported internal combustion engine in which the compression seal is to be mounted.

Figures 1B, 1D:
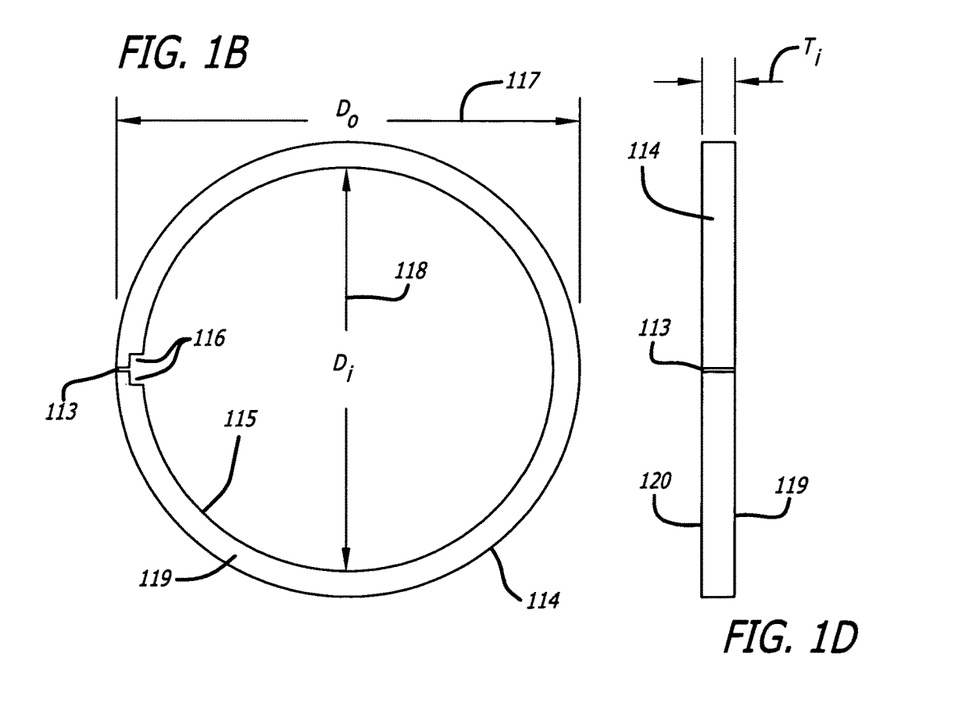
FIG. 1B is a plan view of the low-tension compression seal in a compressed condition.
FIG. 1D is a side elevation view of the low-tension compression seal in the compressed state.

As per FIGS. 1B and 1D, when the compression seal 100 is diametrically compressed as it would be when mounted to a piston received in the bore of a cylinder, the bearing and inner peripheral surfaces define concentric circular shapes. An outside diameter 117 ($D_o$) is measured with respect to an edge of the bearing surface 114. An inside diameter 118 ($D_i$) is measured with respect to an edge of the inner peripheral surface 115. As seen in the elevation views of FIGS. 1C and 1D, the compression seal body 110 has opposing side surfaces 119 and 120. Preferably, the side surfaces 119 and 120 are annular, flat and parallel to a horizontal surface, and essentially perpendicular to the bearing and inner peripheral surfaces 114 and 115. As per FIGS. 1B and 1D, the gap 113 in the compression seal 100 remains slightly open when the bearing surface 114 is seated against the bore; for example, the gap 113 may be open by about 0.33 mm. This slight opening enables the compression seal to undergo thermal expansion during engine operation. The annular compression seal 100 is preferably constituted of conventional materials, such as steel or cast iron with an admixture of carbon and one or more alloys, and may be conventionally coated or plated, as required by any particular application.

Figure 2:
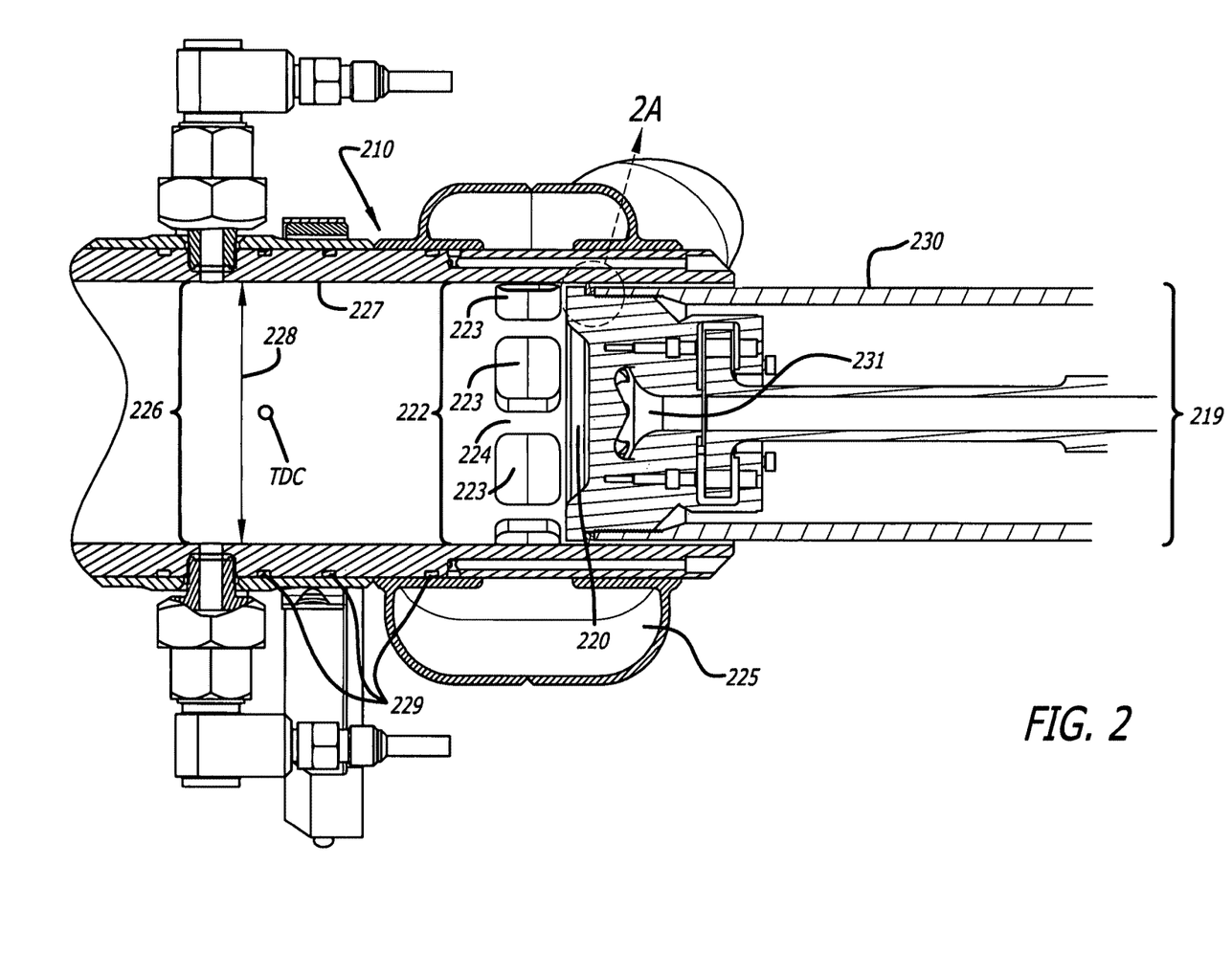
FIG. 2 is a side sectional view of an inlet side of a ported cylinder showing a bore with a piston disposed therein.
Figure 4A:
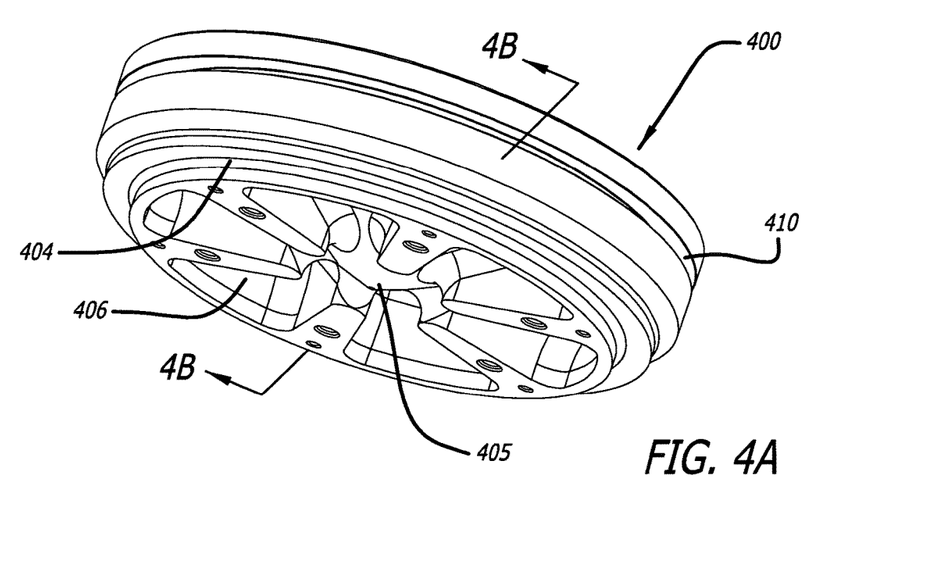
FIG. 4A is a perspective view of a piston crown having a circumferential groove for seating a low-tension compression seal.

FIG. 2 illustrates a piston and cylinder assembly of a ported internal combustion engine in which a low tension compression seal 100 is mounted to a piston. Preferably, but not necessarily, the engine has an opposed-piston construction and operates with a two-stroke cycle. Further, in order to simplify the description, only one compression seal is shown, although this should not limit the application of the principles illustrated, as two or more compression seals can be mounted to the piston. FIG. 2 shows the inlet side of an opposed-piton cylinder assembly, with the understanding that the explanation applies to the exhaust side of the assembly in the same manner. In this regard, see, for example, FIG. 4A of US publication 2006/0157003 A1. In FIG. 2, the opposed piston engine includes a cylinder 210 with a piston 219 having a crown 220 and a skirt 230. The skirt 230 may be mounted to the crown 220 in a compound piston structure, or formed as one piece with the crown, in a unitary piston structure. The cylinder 210 has an inlet port 222 cast or machined into the cylinder near one end thereof. The inlet port 222 is constituted of an annular sequence of openings 223 alternating with bridges 224 between the openings 223. The openings 223 permit the passage of pressurized air from an inlet manifold 225 into the bore 226 of the cylinder 210. The bore 226 is defined by the inside cylindrical surface 227 of the cylinder 210. The bore 226 has a diameter 228. In FIG. 2, the crown 220 is near a bottom dead center (BDC) position. During engine operation, as the piston 219 reciprocates in the bore 226, the crown 220 moves between top dead center (TDC) and BDC positions, traveling back and forth across bridges 224 of the inlet port 222 during each cycle of operation. The front surfaces of the piston crowns may be contoured as seen in FIG. 2, or may be planar.

As per FIG. 2, each of the bore and piston has an axially symmetrical construction, and it is desirable that the axial symmetries of the cylinder bore 226 and the piston crown 220 be maintained substantially throughout all phases of the operational cycle of the engine. With this condition met, circularity of the piston/bore interface is ensured, thereby permitting the use of low-tension compression seals in a ported internal combustion engine. Preferably, but not necessarily, respective cooling structures are tailored to direct liquid coolant on the cylinder liner and the back surface of the piston crown in such a manner as to achieve this condition. For example, liquid coolant directed through cylinder coolant channels 229 on the outer surface of the cylinder liner and a radially symmetrical piston cooling structure 231 on the back surface of the piston crown, both taught in cross-referenced U.S. Pat. No. 7,360,511 and U.S. Pat. No. 7,549,401 (incorporated herein by this reference), maintain the axial symmetries of the bore 226 and the crown 220. Together, these cooling structures direct liquid coolant so as to maintain circularity of the cylinder bore/piston interface, longitudinally of the cylinder, during all phases of engine operation, thereby eliminating the need for high-tension piston rings.

Figure 2A:
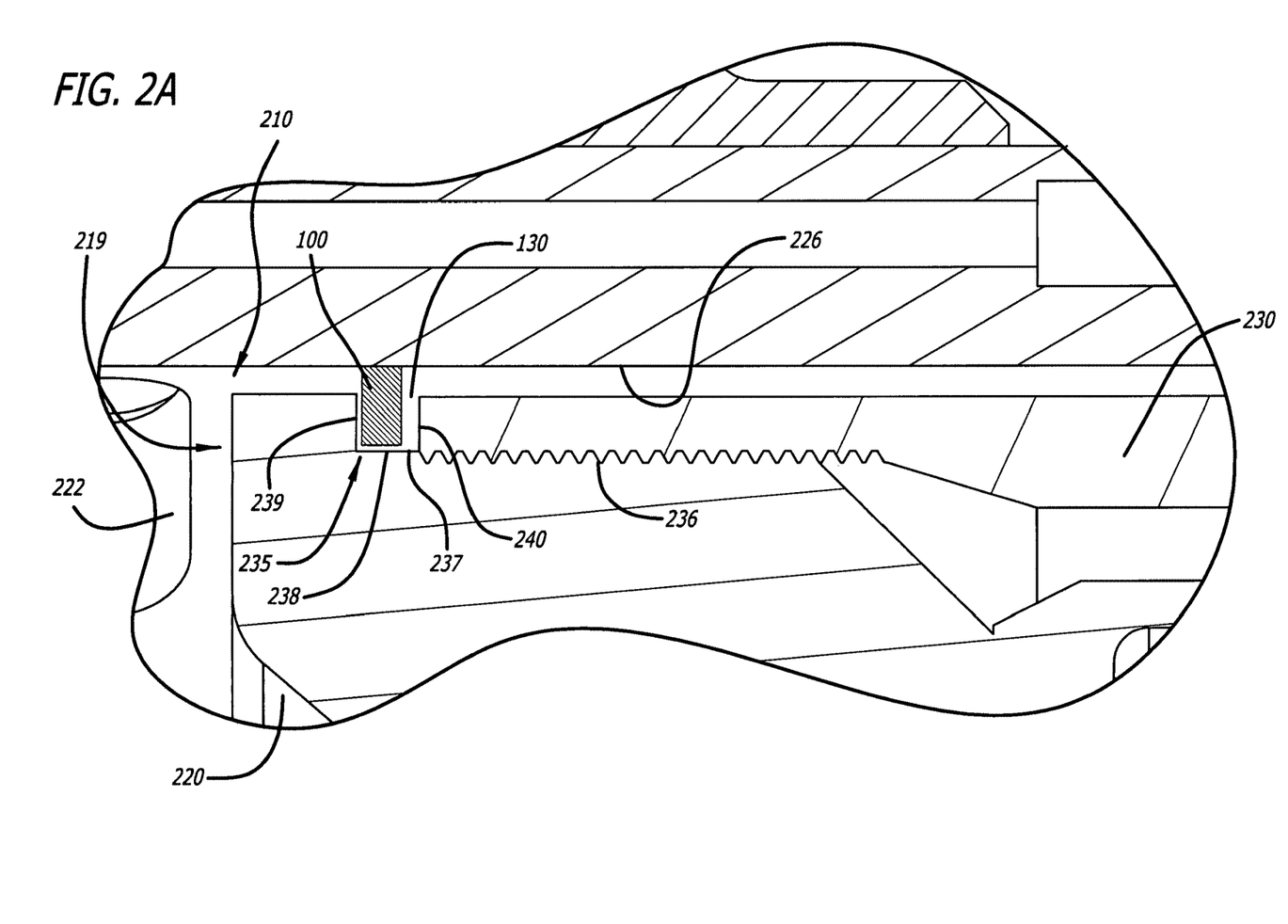
FIG. 2A is an enlarged view of a portion of the piston showing details of a compression seal mounted thereto.

Refer now to FIG. 2A, an enlarged view of the circled portion seen in FIG. 2, in which the spacing between the outer side surface of the piston 219 and the bore of the cylinder 210 is exaggerated for a clearer understanding of the following description. As seen in FIG. 2A, a circumferential groove 235 is provided in the outer side surface of the piston 219, preferably in or near the crown 220. For example, although not necessarily, the groove may be constituted as a gap defined in a compound piston structure when the crown 220 is joined to the upper end of the skirt 230 at 236 (by threading, for example). Alternatively, the groove may be machined or cast into a unitary piston structure. In either case, the compression seal 100 is mounted in the groove 235 in the piston 219. The floor 237 of the groove 235 defines a groove diameter. The groove 235 has opposing walls 239 and 240, with the wall 239 being relatively nearer to the crown 220 than the wall 240.

Figure 1C:
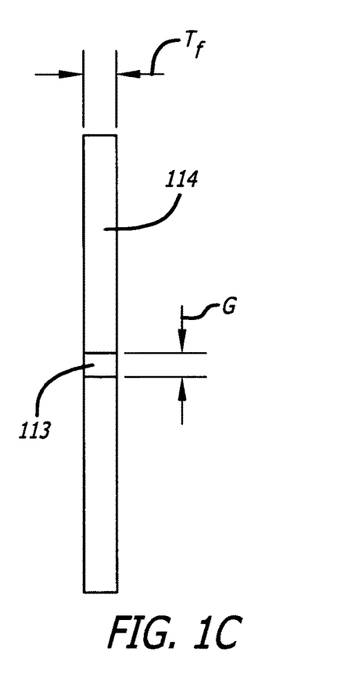
FIG. 1C is a side elevation view of the low-tension compression seal in the uncompressed state.

With reference to FIGS. 1A and 1C, when the compression seal 100 is in its free state, the outside diameter of the compression seal is very slightly larger than the diameter of the bore 226. Thus, as per FIGS. 1B and 1D, when the compression seal 100 is mounted in the groove 235 and compressed slightly in order for the piston to be inserted into the bore 226, the outside diameter of the compression seal 100 is equal to the diameter of the bore 226, in which case the annular bearing surface of the compression seal 100 is very lightly loaded against the bore so that there is unbreached low-tension contact between the bearing surface and the bore. In other words, in the compressed state, there is a residual low level of compression seal tension in the direction of the bore and there is no clearance between the annular bearing surface and the bore. There is a slight opening in the bearing surface where the gap is located; however, this opening becomes negligible when the compression seal expands during engine operation in response to the heat of combustion. The inside diameter of the compression seal 100 is slightly greater than the diameter of the groove 235 shown in FIG. 2A, and the thickness of the compression seal is slightly less than the width of the groove.

Figure 3:
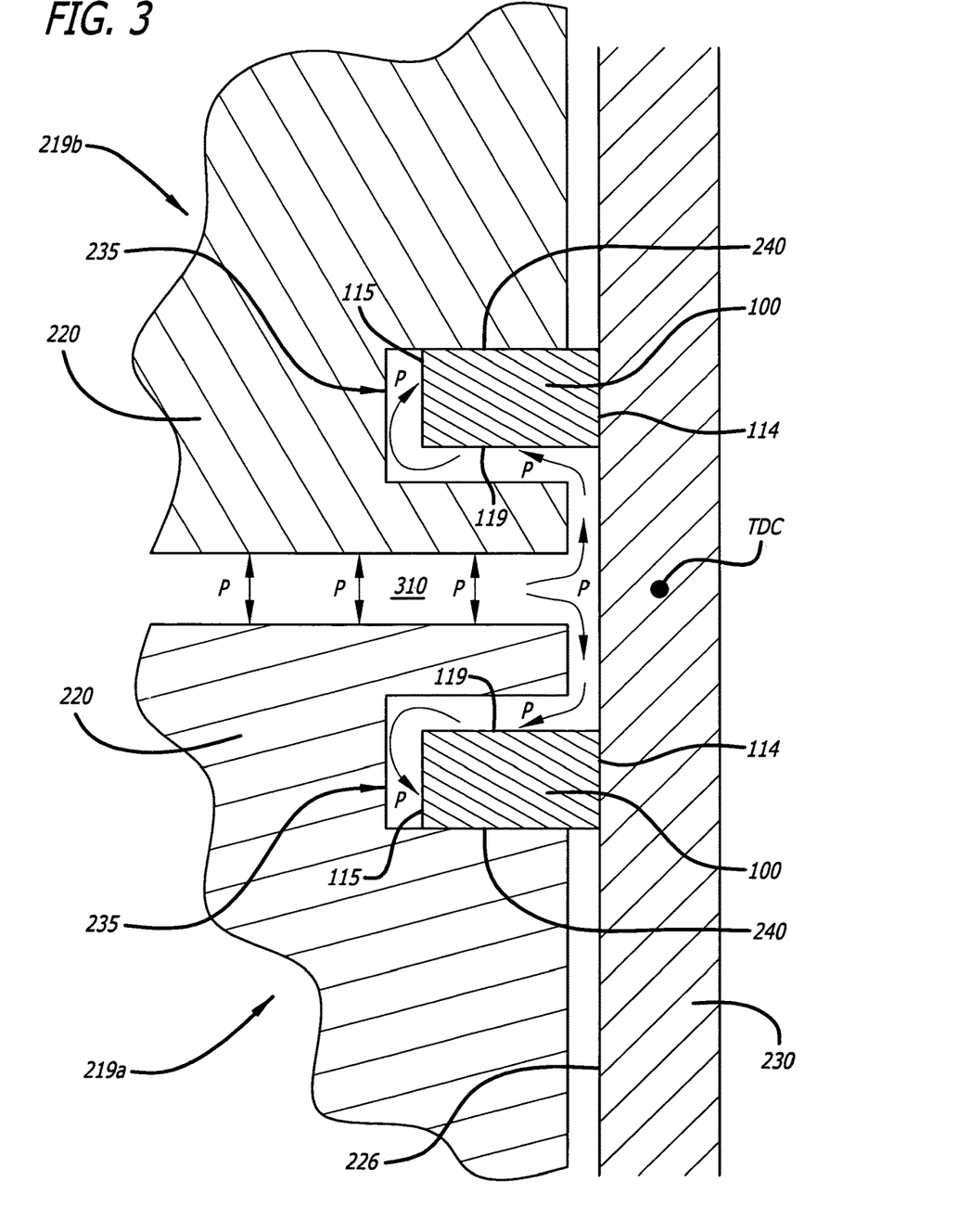
FIG. 3 is a partial schematic illustration of opposed pistons near top dead center when combustion occurs.

Operation of a ported internal combustion engine with one or more low-tension compression seals will now be described using an opposed piston engine as an illustrative example. With reference to FIG. 3, before operation of the ported internal combustion engine commences, each compression seal 100 is loaded by a residual low level of tension in the direction of the bore 226, which urges the bearing surface of the compression seal into engagement against the bore, with no clearance between the bearing surface and the bore. When engine operation commences, as the pistons 219a and 219b move toward their TDC positions, air is compressed between the crowns 220. Combustion occurs in the space 310 when fuel injected into the compressed air ignites as the pistons move through their TDC positions. The pressure (P) produced by combustion acts against the crowns 220, propelling the pistons toward their BDC positions. Some of the combustion gas pressure leaks behind each compression seal 100 and acts against the inner peripheral surface of each compression seal to increase the level of tension in the direction of the bore 226, which urges the bearing surface of the compression seal into a highly-tensioned engagement against the bore, thereby effecting a tight seal that prevents blow-by. After combustion, as the pistons move away from each other and toward their BDC positions, the combustion pressure P continually drops until it reaches an ambient level. As the pressure P drops, the force acting against each compression seal falls until the bearing surface is once again loaded against the bore only by the residual low level of compression seal tension in the direction of the bore with no clearance between the annular bearing surface and the bore as the piston transits the port bridges.

FIGS. 4A-4D illustrate a crown 400 such as can be incorporated into the construction of each of a pair of opposed pistons. The piston construction may include assembly of the crown to a skirt as taught in cross-referenced U.S. Pat. Nos. 7,549,401 and 7,360,511, for example. Alternately, the crown may be an inseparable element of a piston with a unitary construction. The crown preferably is constituted of a durable material such as steel, cast iron, aluminum, or aluminum hybrid, as required by any particular application. For example, we have used crowns made of 4130 alloy steel.

Figure 4B:
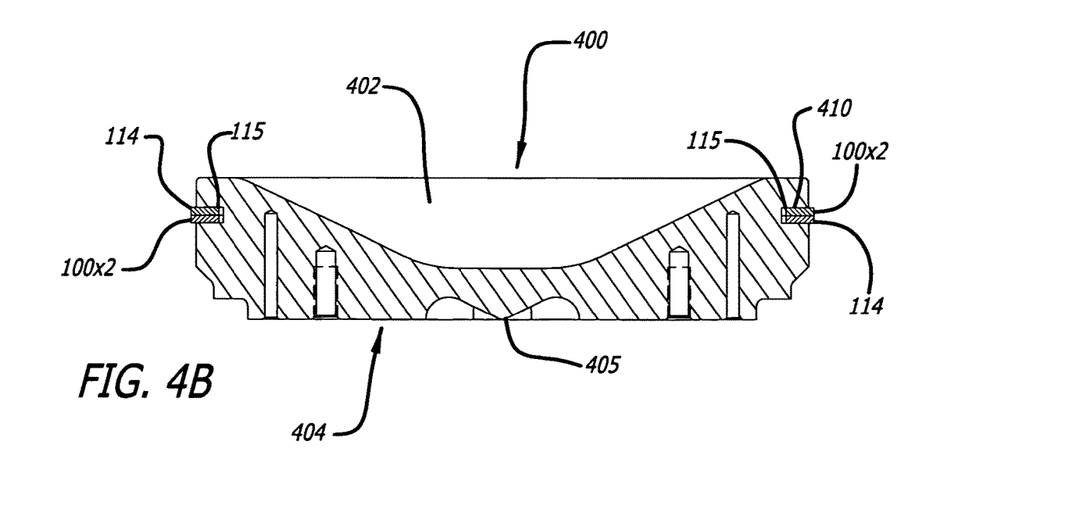
FIGS. 4B, 4C, and 4D are side sectional views of the piston crown of FIG. 4A showing three arrangements for mounting low-tension compression seals.
Figure 4C:
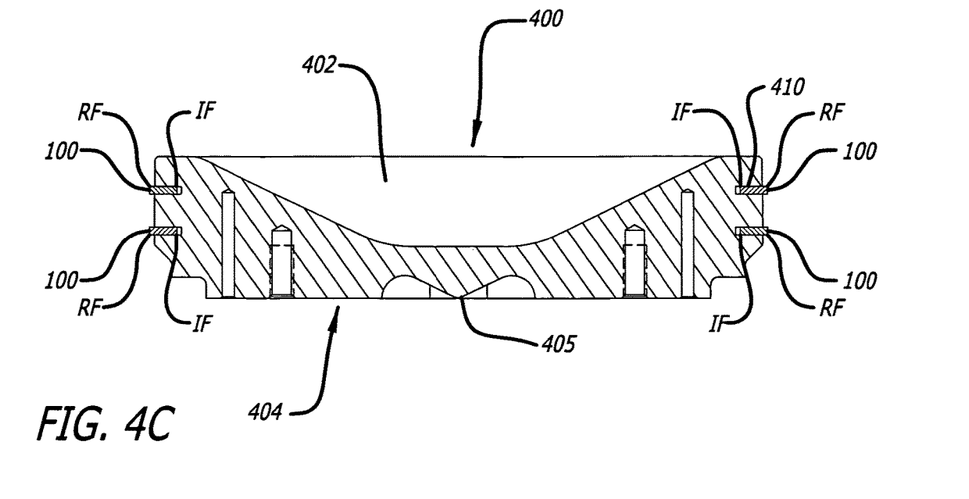
Figure 4D:
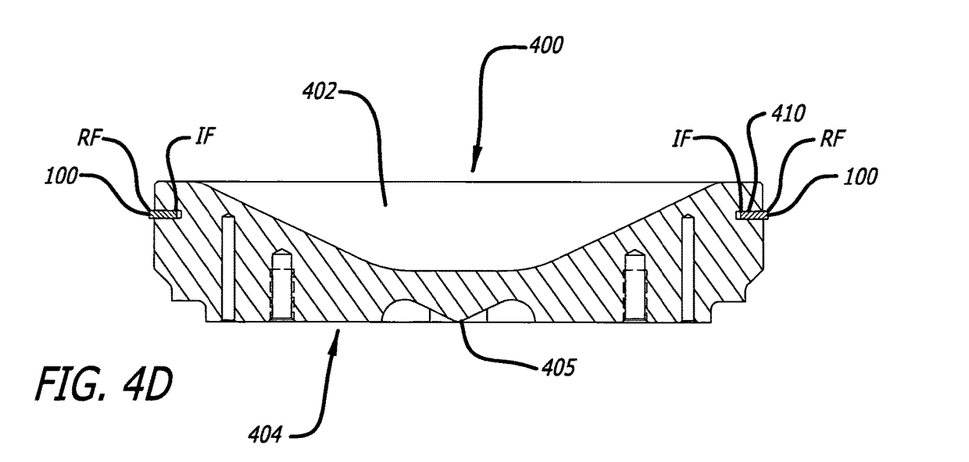

As per FIGS. 4B-4D, the crown 400 includes a front surface 402 which faces the combustion space and a back surface 404. As per FIG. 4A, the construction of the crown includes a coolant structure for radially symmetrical impingement cooling of the back surface 404. Such cooling maintains axial symmetry of the crown 400 during all phases of engine operation. In this regard, liquid coolant is conducted in a tubular piston rod (as seen in FIG. 2, for example) to a central point 405 from which streams of liquid coolant flow through a coolant structure constituted of an radially-symmetric array of channels 406 centered on the longitudinal axis of the crown to the interior surface of the skirt (not shown). The crown includes at least one circumferential groove 410 for mounting a low-tension compression seal.

As per FIGS. 4B, 4C, and 4D, low-tension compression seals 100 are mounted to the crown 400 as a pair in a single circumferential groove 410 in the side surface of the crown (FIG. 4B), as a pair mounted in separate grooves 410 (FIG. 4C), or singly in a single groove 410 (FIG. 4D). If mounted pair-wise, the low tension compression seals 100 of a pair are mutually rotated so as to maintain their gaps 113 out of alignment. Further, if necessitated by design or performance requirements, one or more alignment protuberances (not seen) are formed in the floor of a groove 410 wherein a low tension compression seal 100 is mounted. Each protuberance is shaped to fit into an alignment notch 116 on the inside surface 115 (seen in FIG. 1A) of a compression seal. A groove 410 formed to receive a pair of compression seals may have one protuberance, in which case, the gap and alignment notch of at least one compression seal would be mutually offset. Any protuberance formed in a groove is located on the side of the crown so as to prevent a compression seal it retains from rotating in the groove and maintain the gap of the compression seal in alignment with a bridge of the port which the compression seal traverses. Such alignment prevents the gap from being damaged and/or worn by interacting with edges of port openings.

Figure 4E:
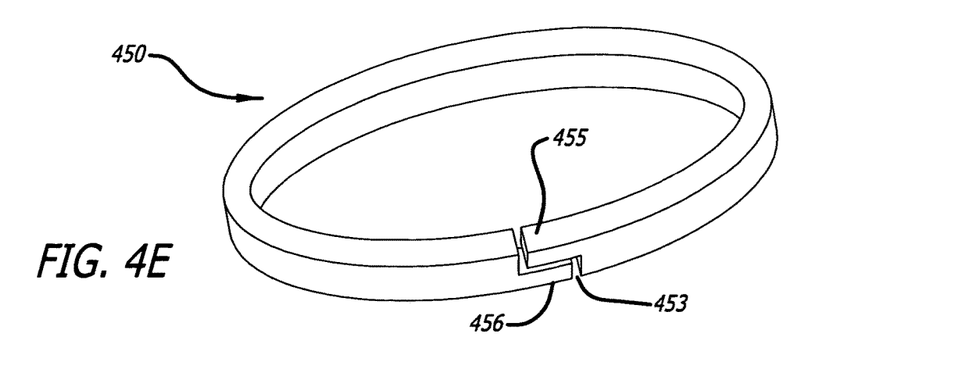
FIG. 4E is s perspective view of a low-tension compression seal with a "Z-shaped" gap.

FIG. 4E illustrates a low-tension compression seal 450 with a "Z-shaped" gap 453 in which a top surface portion 455 of the gap overlays a bottom surface portion 456 of the gap, thereby eliminating a path for combustion gasses to escape through gap 453.

Figure 5:
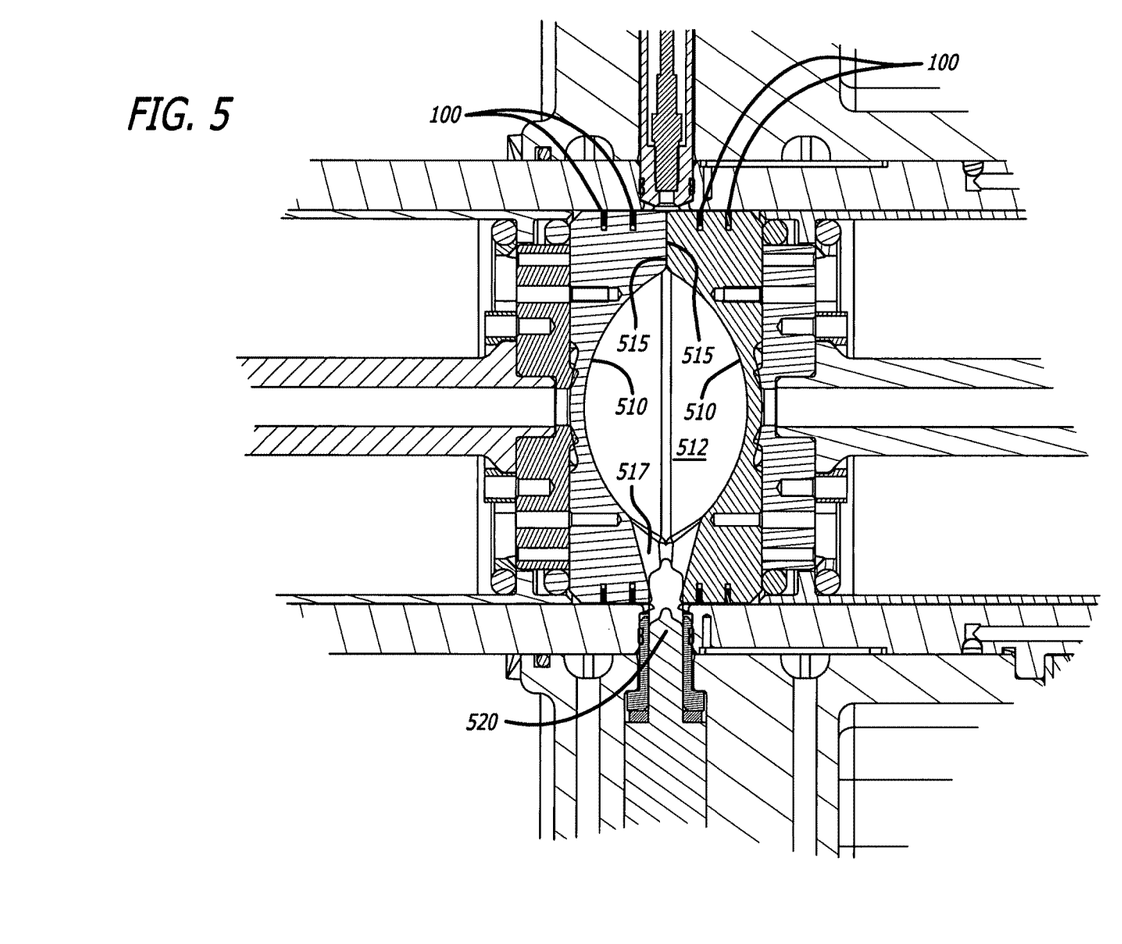
FIG. 5 is a schematic view of an optional piston squish zone to enhance operation of the low-tension compression seal.

An optional opposed-piston configuration including low-tension compression seals is illustrated in FIG. 5. The crowns of a pair of opposed pistons disposed in the bore of a cylinder liner are shown at or near TDC, when fuel is injected between the crowns in order to initiate combustion. Two low-tension compression seals 100 are mounted to each crown. As illustrated, the front surface of each crown has a concave contour 510, preferably, although not necessarily, in the shape of a symmetrical hemispherical bowl. At the end of a compression stroke, the opposing concave contours 510 define a section of a spherical space 512 into which a fresh charge of air has been compressed, and into which fuel is injected to initiate combustion. The flat circular peripheries 515 of the crowns are in close proximity at TDC and form an annular squish zone around the quasi-spherical space. An opening 517 through the squish zone is formed by opposing notches in the crown peripheries; the opening 517 is aligned with an injector nozzle 520 so that fuel can be injected into the quasi-spherical space 512. When the front surfaces of the pistons are this closely spaced, little or no injected fuel is able to pass through the squish zone onto the cylinder bore. One potential benefit realized thereby is reduction or elimination of unburned fuel on the bore surface near TDC that could otherwise reduce the effectiveness of the low-tension compression seals at and immediately following combustion.

Manufacturing application: We have manufactured low-tension compression seals exhibiting an estimated residual low level of tension in the direction of the bore as low as three (3) Newtons when compressed by a diametrically-applied force sufficient to reduce the gap in a seal as would occur in a cylinder bore of 80 millimeters (mm); desirably, the gap is reduced to about 0.3 mm. The starting material was a tube of 440A stainless steel 83 mm in diameter. The tube was heated to 1800° F. and maintained at that temperature for four (4) hours, oil cleansed, and then tempered at 600° F. for four (4) hours, and again oil cleansed. The interior and exterior surfaces of the tube were then turn finished to an outer diameter of 80.4 mm and an inner diameter of 73.9 mm. A low-tension compression seal was manufactured by cutting an annular piece with a thickness of 1 mm from the finished tube with a numerically-controlled mill. The opposing side surfaces of the annular piece were lapped flat and the inside and bearing surfaces were deburred using a hand tool. Per ISO 6621-4, 8.1, a half moon-shaped alignment notch was formed in the inner surface using a 2.38 mm end mill at 73.85 mm diameter. The alignment notch was then located in the mill and the annular piece was split to form the gap. The split was made with a saw and the resulting gap was de-burred. (We formed Z-shaped gaps by use of an Electrical Discharge Machine (EDM) with a "Z" shaped wire with which the overlapping notch was cut). The annular piece was then mounted on a mandrel and the bearing surface was lapped with an 80 mm diameter round lapping tool until it was "light tight" per ISO 6621-4, 7.2. We noted that oscillating the mandrel during lapping would impose a slight barrel shape on the bearing surface. Once light tightness was achieved, a nitride layer was applied to the annular piece per ISO 6621-4, 10.3.2, NT070. Finally, a chromium nitride layer was deposited on the bearing surface.

Referring now to FIGS. 1A and 2, when manufactured as disclosed, the outside diameter of low-tension compression seals ($D_o$) for an 80 mm cylinder bore was typically 80.4 mm+0.05, −0.00 mm, and the inside diameter ($D_i$) of the cylinder bore was measured at 80.0 mm+/−0.0075 mm. The typical thickness of the low-tension compression seals, measured between the opposing side surfaces, was 1.0 mm. When such a low-tension compression seal was mounted to a piston disposed in the 80 mm diameter bore, the annular interface between the annular bearing surface and the bore was light tight, indicating that no clearance occurred between the annular bearing surface and the bore.

The scope of patent protection afforded the novel articles and methods described and illustrated herein may suitably comprise, consist of, or consist essentially of the low-tension compression seal, piston, and ported cylinder. Further, the novel articles and methods disclosed and illustrated herein may suitably be practiced in the absence of any element or step which is not specifically disclosed in the specification, illustrated in the drawings, and/or exemplified in the embodiments of this specification. Moreover, although one or more inventions are described with reference to preferred embodiments, it should be understood that various modifications can be made without departing from the spirit of the invention. Any invention described herein is limited only by the following claims.

The invention claimed is:

1. A method for operating an opposed piston engine in which a pair of pistons is disposed in opposition in the bore of a cylinder, the cylinder including inlet and exhaust ports opening through the bore, each piston including a crown with a front face, a circumferential groove having a floor, and an annular compression seal mounted in the groove, each compression seal including an annular bearing surface and an annular inner peripheral surface spaced from the floor of the groove in which the compression seal is mounted, the method comprising:
   operating the opposed-piston engine with a two-stroke cycle;
   cooling the cylinder and the crown of each piston to maintain circularity of the interface between the bore and each piston;
   contacting the bore with the annular bearing surface of each compression seal;

combusting a mixture of air and fuel in the bore, between the front faces, as the pistons move through respective top dead center (TDC) positions;

the annular bearing surface of each compression seal contacting the bore, with no clearance between the annular bearing surface and the bore, in response to a high level of compression seal tension in the direction of the bore resulting from combustion pressure acting against the inner peripheral surface as the piston moves away from a TDC position;

reducing the compression seal tension resulting from combustion pressure of each compression seal as the piston on which it is mounted moves toward a BDC position;

the annular bearing surface of each compression seal contacting the bore, with no clearance between the annular bearing surface and the bore, in response to a residual low level of compression seal tension in the direction of the bore as the piston traverses a port.

2. The method of claim 1, further comprising:

forming a space between front faces for compressing the air as the pistons move through the TDC positions;

forming an annular squish zone around the space; and injecting the fuel into the space through an opening through the squish zone.

3. The method of claim 2, further comprising maintaining alignment of a gap in each compression seal with a respective port bridge as the piston on which the compression seal is mounted traverses a port.

4. The method of claim 3, wherein the residual low level of compression seal tension is about 3 Newtons.

* * * * *

UNITED STATES PATENT AND TRADEMARK OFFICE
CERTIFICATE OF CORRECTION

PATENT NO. : 10,036,471 B2  
APPLICATION NO. : 12/592030  
DATED : July 31, 2018  
INVENTOR(S) : James U. Lemke et al.

Page 1 of 1

It is certified that error appears in the above-identified patent and that said Letters Patent is hereby corrected as shown below:

In the Specification

-- Column 1, Line 33, delete "Jun. 23, 3009" and replace with "Jun. 23, 2009"

Signed and Sealed this
Twentieth Day of November, 2018

Andrei Iancu
*Director of the United States Patent and Trademark Office*